United States Patent
Kupfer et al.

(10) Patent No.: US 12,084,218 B2
(45) Date of Patent: Sep. 10, 2024

(54) DEVICE FOR ORIENTING A PACKAGING

(71) Applicant: Bausch + Ströbel Maschinenfabrik Ilshofen GmbH + Co. KG, Ilshofen (DE)

(72) Inventors: Timo Kupfer, Obersontheim (DE); Jürgen Munz, Obersontheim (DE); Hans Werner Kreft, Schnelldorf-Unterampfrach (DE); Stefan Ebert, Weipertshausen (DE)

(73) Assignee: Bausch + Ströbel Maschinenfabrik Ilshofen GmbH + Co. KG, Ilshofen (DE)

( * ) Notice: Subject to any disclaimer, the term of this patent is extended or adjusted under 35 U.S.C. 154(b) by 409 days.

(21) Appl. No.: 17/609,187

(22) PCT Filed: Apr. 29, 2020

(86) PCT No.: PCT/EP2020/061827
§ 371 (c)(1),
(2) Date: Nov. 5, 2021

(87) PCT Pub. No.: WO2020/225042
PCT Pub. Date: Nov. 12, 2020

(65) Prior Publication Data
US 2022/0227522 A1 Jul. 21, 2022

(30) Foreign Application Priority Data
May 6, 2019 (DE) ............ 10 2019 206 449.3

(51) Int. Cl.
*B65B 69/00* (2006.01)
*B65G 47/22* (2006.01)

(52) U.S. Cl.
CPC .......... *B65B 69/0008* (2013.01); *B65G 47/22* (2013.01); *B65G 2207/42* (2013.01)

(58) Field of Classification Search
CPC ..... B65B 69/0008; B65B 49/06; B65G 47/22; B65G 2207/42
See application file for complete search history.

(56) References Cited

U.S. PATENT DOCUMENTS 5,069,594 A * 12/1991 Bott .................. B65B 69/0033
  53/381.1
5,419,095 A    5/1995 Yohe

FOREIGN PATENT DOCUMENTS

CN    1115176 A    1/1996
CN    101687559 A   3/2010
(Continued)

OTHER PUBLICATIONS

WO-2008155183-A1, Machine translation of description (Year: 2008).*
(Continued)

*Primary Examiner* — Saul Rodriguez
*Assistant Examiner* — Lucia Elba Rodriguez
(74) *Attorney, Agent, or Firm* — Kilpatrick Townsend & Stockton LLP

(57) ABSTRACT

A device for orienting a packaging, such as a sterile packaging. Orienting the package comprises one or more of folding open or tightening at least one edge of the packaging in a substantially horizontal plane. The device arranges the packaging into a working position in which the packaging is oriented. The device comprises a brush station having at least one substantially horizontally oriented rotating brush designed and arranged to come into frictional contact with the at least one edge of the packaging.

19 Claims, 3 Drawing Sheets

(56) References Cited

FOREIGN PATENT DOCUMENTS

| | | | | | |
|---|---|---|---|---|---|
| CN | 103723305 | A | | 4/2014 | |
| CN | 103732497 | A | * | 4/2014 | ............. B65B 19/20 |
| CN | 108454963 | A | * | 8/2018 | ........... B65B 35/243 |
| CN | 108820402 | A | * | 11/2018 | ......... B65B 69/0033 |
| CN | 208360685 | U | * | 1/2019 | |
| DE | 102007027878 | A1 | | 12/2008 | |
| DE | 102011080289 | A1 | | 2/2013 | |
| DE | 102017123387 | A1 | | 4/2019 | |
| JP | 6756954 | B2 | * | 9/2020 | |
| WO | WO-2008155183 | A1 | * | 12/2008 | ......... B65B 69/0008 |
| WO | WO-2020187824 | A1 | * | 9/2020 | ......... B65B 69/0008 |

OTHER PUBLICATIONS

CN-103732497-A, Machine translation of description (Year: 2014).*
CN-108454963-A, Machine translation of description (Year: 2018).*
CN-108820402-A, Machine translation of description (Year: 2018).*
JP 6756954 B2, Machine translation of description (Year: 2020).*
Chinese Application No. CN202080029516.2 , "Office Action", Aug. 17, 2022, 9 pages.
German Application No. 102019206449.3, German Search Report mailed Nov. 27, 2019, 5 pages.
International Application No. PCT/EP2020/061827, International Search Report and Written Opinion mailed Jul. 21, 2020, 12 pages.

* cited by examiner

DEVICE FOR ORIENTING A PACKAGING

CROSS REFERENCE TO RELATED APPLICATIONS

This application is a U.S. national phase of International Patent Application No. PCT/EP2020/061827 filed on Apr. 29, 2020, which claims priority to German Patent Application No. 10 2019 206 449.3, filed in Germany on May 6, 2019. The entire contents of both applications are hereby incorporated herein by this reference.

The present invention relates to a device for orienting a packaging, in particular a sterile packaging, which is provided for folding open and/or tightening at least one edge of the packaging in a substantially horizontal plane, wherein a working position is defined in which a packaging to be oriented is to be arranged during operation of the device.

Pre-sterilised objects, such as injection syringes, are usually held in so-called tubs for their transport, which tubs in turn are welded into one or more bag-shaped packaging units. The objects are removed from the packaging and the tub in accordance with GMP guidelines and the NTT (No Touch Transfer) concept. For this purpose, the bag-shaped packaging must be oriented accordingly in order to be able to be cut open in a defined manner, wherein this cutting process ideally can be integrated in a modular manner in an overall process sequence.

In order to provide a defined cutting region in this context, such bag-shaped containers usually comprise a tab corner called an "edge", which is folded in for transport and is only folded open and/or tightened again immediately before the cutting to be performed to open the container. This process is collectively referred to as "orienting" the packaging and has the object of preparing the packaging for subsequent cutting, which can be carried out, for example, after it has been transferred to a cutting device.

In previously known devices for orienting and cutting packaging in this way, the orienting step could either be carried out manually by a machine operator or automatically by means of a vacuum chamber into which the packaging was inserted, wherein the packaging is oriented by inflating after the vacuum chamber has subsequently been evacuated. Furthermore, automatic devices for orienting a package were also known, in which a needle was inserted into the bag-shaped packaging and a suitable inert gas was blown through this needle. In such devices, too, the edge to be cut was folded open due to the relative overpressure inside the packaging, and the packaging was thus oriented.

Although savings can be achieved by using automatic devices for orienting packaging compared to manually orienting packaging, the previously known automatic devices for this purpose are mechanically relatively complex and expensive to operate, and there is therefore still room for improvement. It is therefore the object of the present invention to provide a generic device which, without sacrificing its reliability, has a simplified mechanism in which in particular a vacuum pump or overpressure pump, as is necessary in the devices described above and known from the prior art, can be dispensed with.

To achieve this object, the device according to the invention comprises a brush station having at least one substantially horizontally oriented rotating brush, which is designed and arranged to come into frictional contact with the edge of the packaging to be folded open and/or tightened.

It is the merit of the inventors of the present device to have found that an edge of a packaging can be folded open not only by a pressure difference between the inside and the outside of the packaging, but also by purely mechanical and thus inexpensive and low-maintenance means, which make physical contact with the corresponding edge of the packaging, and orient and smooth same. It goes without saying that the terms "horizontal" and "vertical" used in this context are primarily intended to indicate that two directions are orthogonally oriented with respect to one another. It is of course also conceivable to arrange the device according to the invention so as to be tilted at an angle to the horizontal.

Although a single brush can be used to fold open and/or tighten an edge of a packaging, for example if a suitable contact surface is provided opposite this brush, against which the edge can rest when it comes into contact with the brush, in a development of the device according to the invention, the brush station may comprise at least one upper brush and at least one lower brush, which are designed and arranged in such a way that, when the edge of the packaging in the working position is folded open and/or tightened, said packaging is received between the at least one upper brush and the at least one lower brush, in order to come into contact with the brushes on both sides. Since both the upper side and lower side of the edge to be folded open and/or tightened are in frictional contact with at least one brush in each case, the tensile effect acting on both sides on the material of the edge can ensure uniform tightening thereof.

In a further preferred embodiment, two upper and two lower brushes can be provided in each case, which are arranged to extend from both sides of the edge of the packaging in the working position that is to be folded open and/or tightened, towards the centre of said packaging. The provision of two upper and two lower brushes in each case is a further measure that ensures an improved tensile effect on the edge of the packaging, since, as a result, identical or similar forces not only act on the upper and lower sides of the edge, but it can also be ensured that identical or similar forces also act on both sides in the horizontal plane on the upper side and the lower side of the edge, so that the tightening effect of the device according to the invention is also improved by this measure.

As an alternative or in addition, the one or at least one of the brushes can be arranged so as to be pivotable in a predetermined angular range about a substantially vertical pivot axis. The pivoting movement to be carried out by the at least one brush has the advantage that it can also provide a force component for folding open and/or tightening the edge of the packaging, and it can also enable simplified placement of the packaging in the working position, since by pivoting the at least one brush can first be moved away from the working position and the packaging before the actual folding open and/or tightening process begins, for which the at least one brush can be pivoted again in the direction of the packaging positioned in this way.

In order to allow such an operation, the device according to the invention can furthermore comprise a control device which controls the rotational operation of the at least one brush and the pivoting movement of the at least one brush in a coordinated manner. The individual brushes can be pivoted independently of one another if necessary. For this purpose, separate drive motors can then be provided to drive the rotational movement and the pivoting movement, while, in an alternative embodiment in which the control device is dispensed with, the intended operation of the device according to the invention can also be achieved, for example, by a single motor having suitable deflection means and gears. In any case, suitable drive means can also be used to cause movements of the individual brushes with respect to further degrees of freedom, for example a stroke, wherein all of the brushes could again be moved individually and independently of one another.

In one possible embodiment, the or at least one of the brushes of the device according to the invention can comprise a roller body and a plurality of bristles attached to the roller body, wherein the contour of the roller body preferably allows the bristles to bend away. In this embodiment, the friction to be generated between the brush and the edge of the packaging to be folded open and/or tightened is achieved substantially solely by the plurality of bristles, while the roller ideally has only a very low coefficient of friction in order to prevent the entire bag-shaped packaging from being drawn in by the rollers.

Here, for example, in an embodiment in which at least one upper and at least one lower brush are provided, the bristles of the at least one upper brush and the bristles of the at least one lower brush can be axially offset from one another. Furthermore, the bristles on at least one of the brushes can be rotationally offset from one another, for example arranged in a spiral shape with respect to one another.

In an alternative embodiment, the or at least one of the brushes could be formed by a cylinder having a surface made of a material which has a suitable coefficient of friction, for example silicone, and the cylinder can preferably have a circular, elliptical or oval base.

In a development of the device according to the invention, the device can further comprise a feed and/or positioning device which is designed to feed a packaging to be oriented to the working position and/or to position said packaging at this working position. Although manual positioning of the packaging to be oriented in the working position is also possible, the provision of the feed and/or positioning device can accommodate the desire for a higher degree of automation and better integrability of the device according to the invention in a complex overall process.

An example of such a system for orienting and cutting open a packaging, in particular a sterile packaging, according to the invention can comprise a device as described above and a downstream cutting device which is designed to cut open the packaging in the region of the folded-open and/or tightened edge. Here, the cutting device can be placed in such a way that it already cuts open the packaging that is still in the working position in the region of the folded-open and/or tightened edge and thus has to assume a position that was previously used by the at least one brush during the process of folding open and/or tightening, while, in an alternative embodiment, a transfer device can be provided which is designed to transfer the packaging in the state with the folded-open and/or tightened edge from the device for orientation to a separately formed cutting device.

Further advantages and features of the present invention will become even clearer from the following description of an embodiment of a device according to the invention when it is considered together with the accompanying drawings. In detail, in the drawings:

FIGS. 1a and 1 b are a plan view of a device according to the invention in operation;

In the accompanying figures, a device according to the invention for orienting a packaging is shown in a plan view or a side view in a plurality of operating states and is denoted quite generally by the reference sign 10.

The device 10 is used to fold open and tighten an edge of a packaging V that has been folded in, wherein the edge of the packaging V is denoted by the reference sign K. The sequence of this work process can be understood in particular with the aid of FIGS. 2a to 2d, which show the work steps to be carried out in chronological order.

In the example shown here, a tub T is accommodated within the packaging V, which tub, for example, can in turn contain injection syringes or other sterile articles, and around which the packaging V has been arranged and sealed by welding.

Figure 2A:
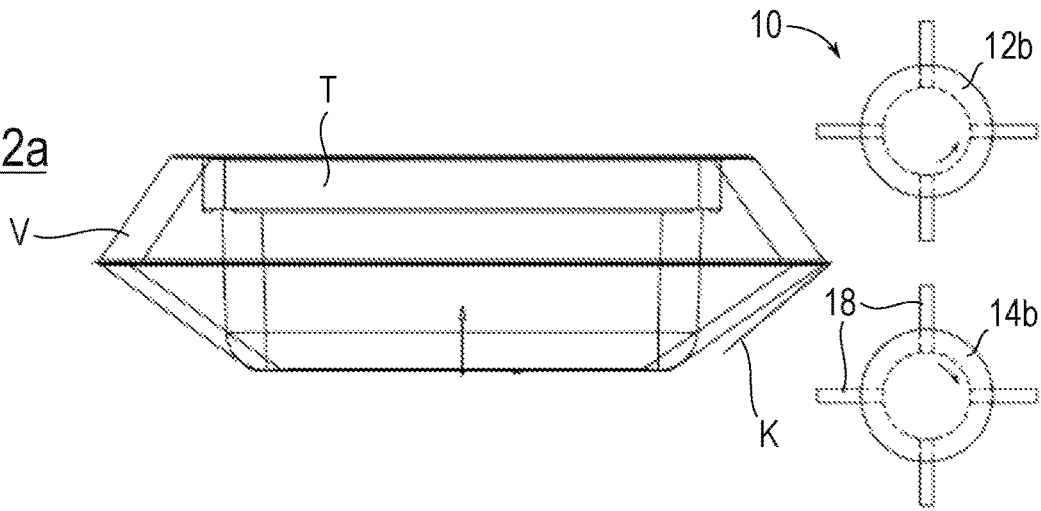
FIGS. 2a to 2d show the device from FIGS. 1a and 1 b in a side view.
Figure 2B:
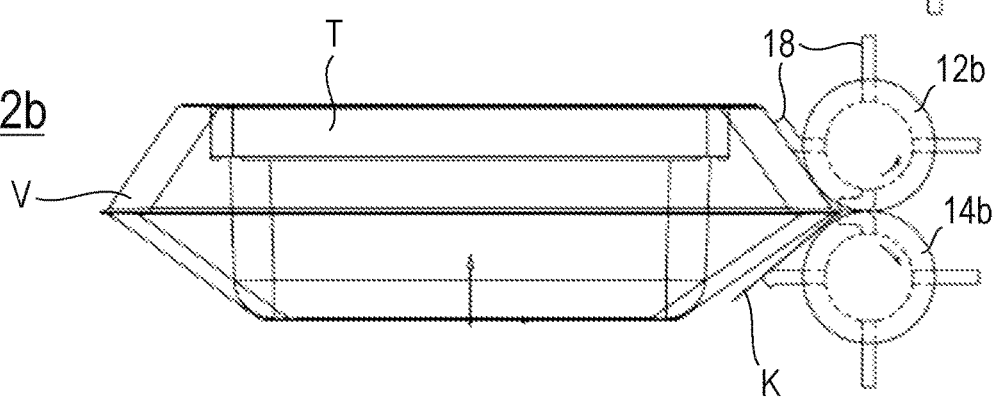

To transport the packaging V, the edge K thereof was initially folded in, as can be seen, for example, in FIGS. 2a and 2b. In order to be able to achieve a reliable cutting open of the bag-shaped packaging V, the edge K of the packaging V to be cut must first of all be folded open and oriented. It is desirable here to provide the edge K so as to be as flat as possible and free of folds in the state to be cut.

Figure 1A:
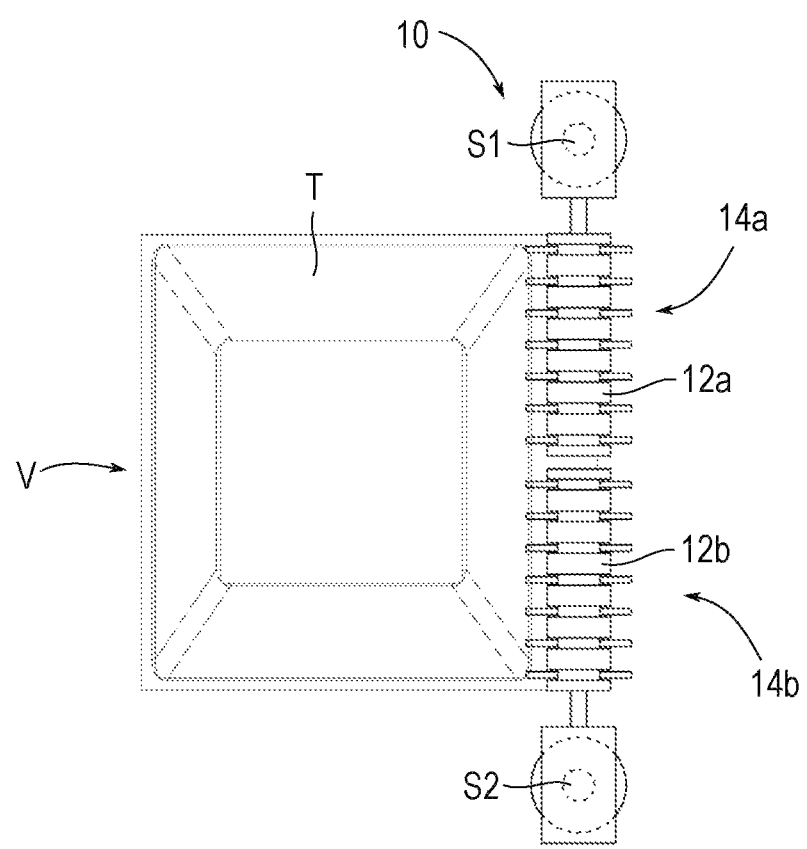
Figure 1B:
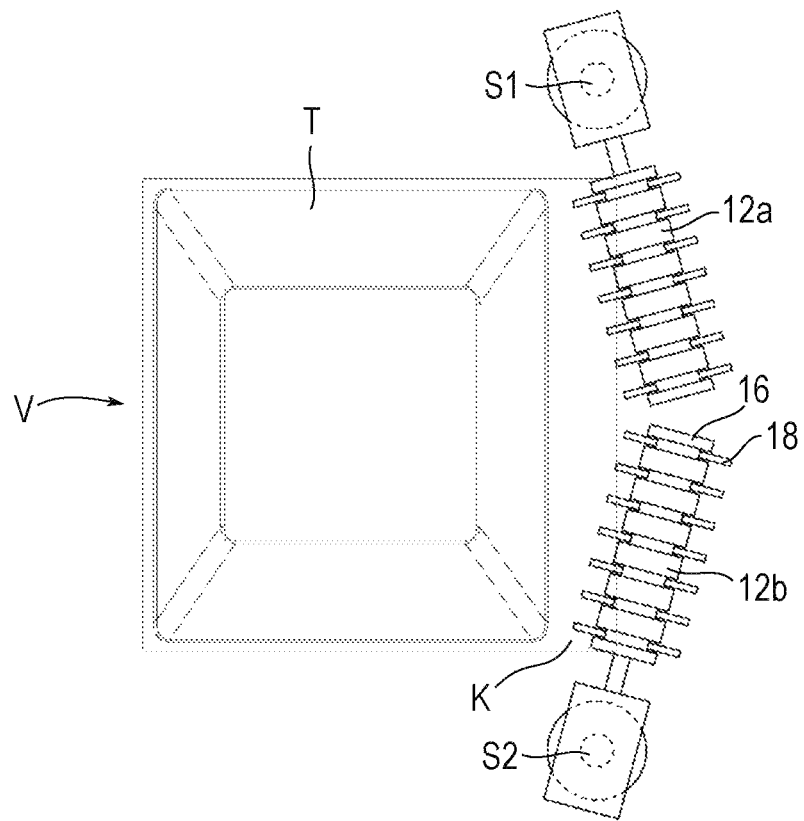

For this purpose, the device 10 according to the invention comprises a pair of upper and lower brushes 12a, 12b or 14a, 14b in each case, which in their entirety form a brush station within the meaning of the present disclosure, wherein only the two upper brushes FIGS. 12a and 12b can be seen in the plan views from FIGS. 1a and 1b, and positions of the lower brushes 14a and 14b are indicated by arrows, while only the two brushes 12b and 14b are shown in the side view from FIGS. 2a to 2d. As can also be seen in FIGS. 1a and 1 b, the two brushes 12a and 12b are pivotable in a predetermined angular range about respective pivot axes S1 and S2, which furthermore also applies to the two lower brushes 14a and 14b, which lie below the two upper brushes 12a and 12b and thus can also be pivoted about the same axes S1 and S2.

Figure 2C:
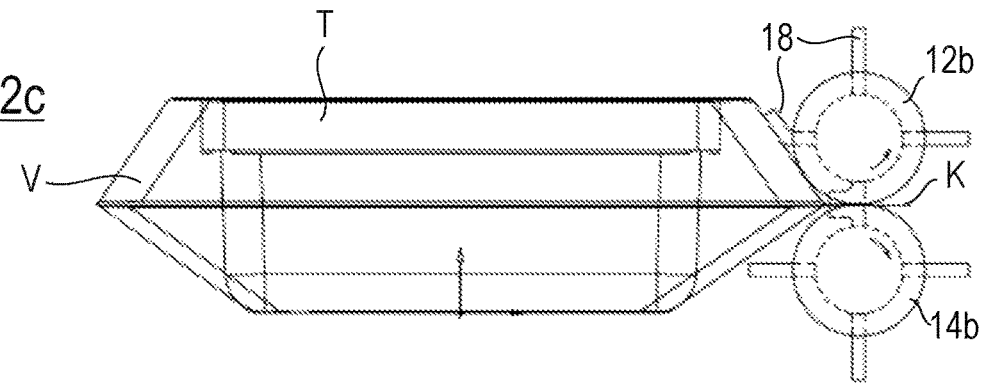
Figure 2D:
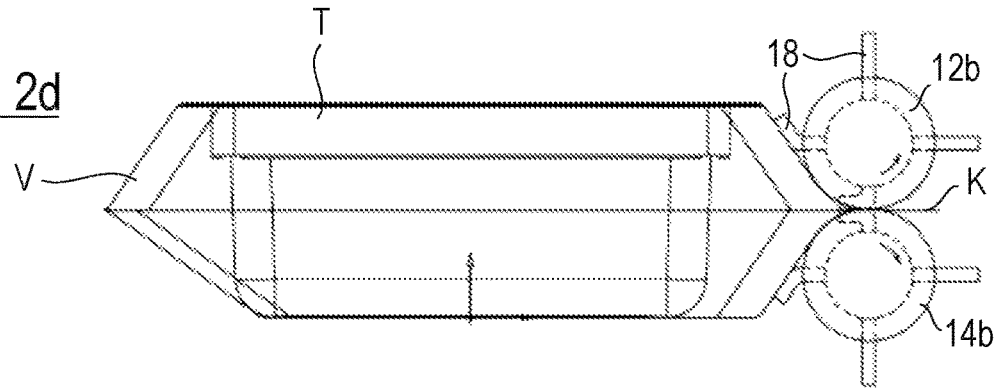

Each of the brushes 12a to 14b is in the form of a roller body 16 having a plurality of bristles 18, wherein the bristles 18 are flexible, as can be seen, for example, in FIGS. 2b to 2d, and the roller body 16 is also provided with depressions in the region of the bristles 18, which allow the bristles 18 to be bent away. In contrast to the rollers 16, the flexible bristles 18 are formed from a material having a high coefficient of friction, so that they can exert a considerable force on the edge K to be folded open when the brushes 12a to 14b, as indicated by the arrows in FIGS. 2a to 2d, rotate.

As can be seen in FIGS. 2a to 2d, the process of folding open and/or tightening the edge K of the packaging V takes place in such a way that the packaging V is first transferred to its working position in the device 10 (FIG. 2a), while the brushes 12a to 14d are still in their pivoted position, which is also shown in FIG. 1b.

After the packaging V has been placed in the working position in the device 10, the brushes 12a to 14b are pivoted back into the position shown in FIG. 1a and come into contact with the packaging V in the region of the edge K. Here, the upper brushes 12a and 12b each rotate counterclockwise, while the lower brushes 14a and 14b rotate clockwise. The drive of the individual brushes can be controlled by a control device (not shown) and driven by one or more electric motors, wherein the motors driving the rotation and the motors driving the pivoting about the axes S1 and S2 can be operated in a coordinated manner. Initially, the edge K is still folded in, but it is folded back upwards by means of the frictional engagement, first with the lower brushes 14a and 14b, until it is framed in a symmetrical manner between the upper brushes 12a and 12b and the lower brushes 14a and 14b, as shown in FIG. 2c.

Since symmetrical forces are now exerted on the edge K by the upper brushes 12a and 12b and the lower brushes 14a and 14b, the packaging V, as shown in FIG. 2d, is oriented and can be cut open in a subsequent working step in the region of the edge K, without the tub T accommodated in the packaging V being impaired by the cutting process.

Figure 3:
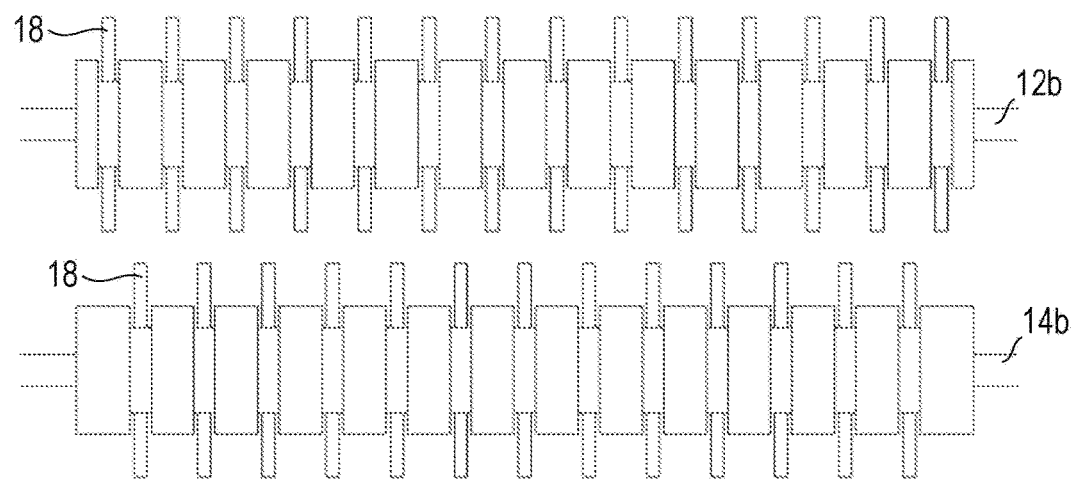
FIG. 3 is a front view of the brushes of the device from FIG. 1a to 2d.

A possible arrangement of the individual bristles 18 on two opposing brushes 12b and 14b is shown in FIG. 3, wherein, in order to ensure desired effect of the device, the bristles 18 are axially offset from one another, so that the forces acting on the edge K of the packaging P can engage optimally.

Figure 4:
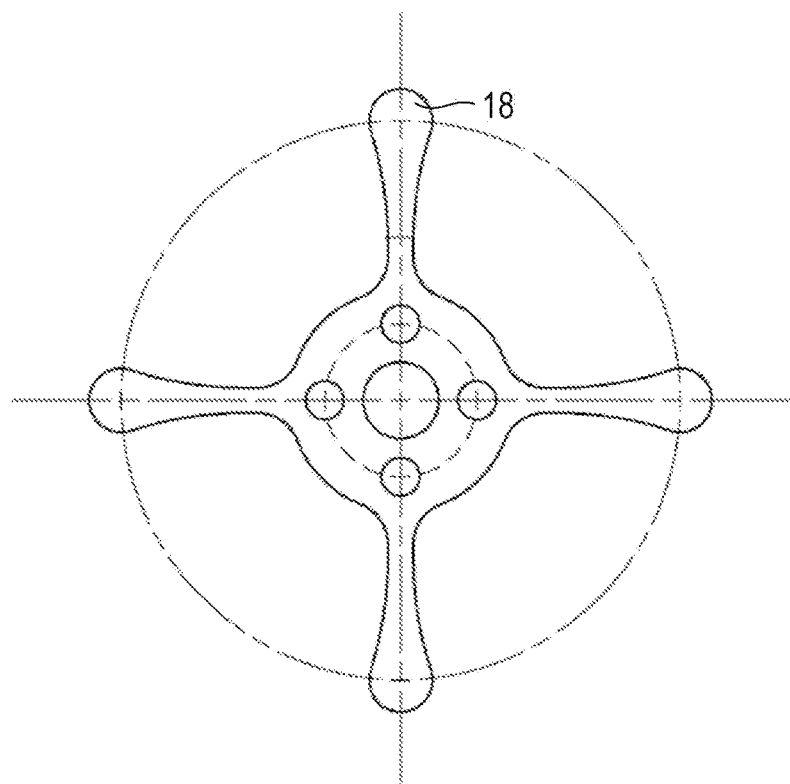
FIG. 4 shows a possible embodiment of the bristles on the respective brushes.

Finally, FIG. 4 shows a cross section through a possible embodiment of the bristles 18 on the respective brushes 12a, 12b, 14a and 14b. Four bristles 18, which are arranged in a star shape and each have a club shape, are provided. This shape ensures that the bristles 18 are sufficiently flexible to bend when they come into contact with the packaging V, while the contact area between the bristles 18 and the packaging V is optimised. Of course, in other variants of the present invention, a different number of bristles 18 can also be arranged in a star shape in such a configuration, for example three or six, or only two bristles 18 lying opposite one another can be provided.

The invention claimed is:

1. A device for orienting a packaging, wherein orienting the packaging comprises one or more of folding open or tightening at least one edge of the packaging in a substantially horizontal plane, wherein the packaging is arranged into a working position during operation of the device, wherein the device comprises:
a brush station having at least one substantially horizontally oriented rotating brush designed and arranged to come into frictional contact with the at least one edge of the packaging, wherein at least one brush of the brushes is further arranged to be pivotable in a predetermined angular range about a substantially vertical pivot axis.

2. The device of claim 1, wherein the brush station comprises brushes including at least one upper brush and at least one lower brush arranged in such a way that, when the at least one edge of the packaging in the working position is oriented, the packaging is received between the at least one upper brush and the at least one lower brush, wherein the packaging comes into contact, on two sides, with the brushes.

3. The device of claim 2, wherein the device comprises at least two upper brushes and two lower brushes arranged to extend from the two sides of the at least one edge toward a center of the packaging in the working position that is to be oriented.

4. The device of claim 1, wherein rotational operation of the brushes and pivoting movement of the brushes is controlled in a coordinated manner.

5. The device of claim 1, wherein at least one of the brushes comprises a roller body and a plurality of bristles.

6. The device of claim 2, wherein each of the at least one upper brush and the at least one lower brush comprises a plurality of bristles, and wherein the bristles of the at least one upper brush and the bristles of the at least one lower brush are axially offset from one another.

7. The device of claim 5, wherein the bristles on at least one of the brushes are rotatively offset from one another.

8. The device of claim 1, wherein at least one of the brushes is formed by a cylinder.

9. The device of claim 1, further comprising a positioning device to position the packaging in the working position.

10. A system for orienting and cutting open a packaging, wherein orienting the packaging comprises one or more of folding open or tightening at least one edge of the packaging, wherein the system comprises:
a device for orienting the packaging in a substantially horizontal plane, and for placing the packaging into a working position during operation of the device, the device comprising a brush station having at least one substantially horizontally oriented rotating brush designed and arranged to come into frictional contact with at least one edge of the packaging, wherein at least one brush of the brushes is further arranged to be pivotable in a predetermined angular range about a substantially vertical pivot axis,
wherein the system is configured to cut open the packaging in a region of the at least one edge.

11. The system of claim 10, the system further configured to transfer the packaging in a state with the at least one oriented to be cut open.

12. The system of claim 10, wherein the packaging comprises a sterile packaging.

13. The device of claim 1, wherein the packaging comprises a sterile packaging.

14. The device of claim 5, wherein a contour of the roller body allows the bristles to bend away.

15. The device of claim 7, wherein the bristles on at least one of the brushes are arranged in a spiral shape with respect to one another.

16. The device of claim 8, wherein the at least one of the brushes formed by the cylinder has a surface made of a material which has a suitable coefficient of friction.

17. The device of claim 16, wherein the material of the cylinder from which the at least one of the brushes is formed comprises silicone.

18. The device of claim 16, wherein the cylinder has a circular base, an elliptical base, or an oval base.

19. The device of claim 1, the device further configured for automated orientation of the packaging into the working position.

* * * * *